United States Patent
Hanscom et al.

(10) Patent No.: US 7,856,027 B2
(45) Date of Patent: Dec. 21, 2010

(54) INBOUND BLOCKING OF DATA RECEIVED FROM A LAN IN A MULTI-PROCESSOR VIRTUALIZATION ENVIRONMENT

(75) Inventors: Jeffrey C. Hanscom, Poughkeepsie, NY (US); Howard M. Haynie, Wappingers Falls, NY (US); Bruce H. Ratcliff, Red Hook, NY (US); Jeffrey M. Turner, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 208 days.

(21) Appl. No.: 12/036,628

(22) Filed: Feb. 25, 2008

(65) Prior Publication Data

US 2009/0213864 A1    Aug. 27, 2009

(51) Int. Cl.
*H04L 12/56* (2006.01)
(52) U.S. Cl. .................. 370/412; 370/230; 713/150; 702/79
(58) Field of Classification Search .............. 370/230, 370/412, 470; 713/150; 710/317; 702/79
See application file for complete search history.

(56) References Cited

U.S. PATENT DOCUMENTS

| | | | |
|---|---|---|---|
| 5,893,120 A * | 4/1999 | Nemes | 707/206 |
| 6,397,350 B1 * | 5/2002 | Baskey et al. | 714/11 |
| 6,810,044 B1 * | 10/2004 | Szczepanek | 370/470 |
| 7,228,375 B1 * | 6/2007 | Jacobson, Van | 710/317 |
| 2003/0037042 A1 * | 2/2003 | Kametani | 707/3 |
| 2004/0015686 A1 * | 1/2004 | Connor et al. | 713/150 |
| 2005/0209804 A1 * | 9/2005 | Basso et al. | 702/79 |

OTHER PUBLICATIONS

"IBM® z/Architecture Principles of Operation", Publication No. SA22-7832-05, 6th Edition, Apr. 2007. 1,215 pages separated into 4 electronic attachments.

* cited by examiner

*Primary Examiner*—Albert T Chou
(74) *Attorney, Agent, or Firm*—Cantor Colburn LLP; Steven Chiu (57) ABSTRACT

An incoming LAN traffic management system comprising: an I/O adapter configured to receive incoming packets from an Ethernet; a plurality of hosts coupled to the I/O adapter and each having a host buffer; a data router configured to block information received by the I/O adapter into memory locations from an SBAL associated with at least one of the plurality of hosts and in accordance with blocking parameters for the at least one of the plurality of hosts, the data router including an expiration engine configured to expire the SBAL before it is full if at least one predetermined threshold is exceeded.

12 Claims, 6 Drawing Sheets

INBOUND BLOCKING OF DATA RECEIVED FROM A LAN IN A MULTI-PROCESSOR VIRTUALIZATION ENVIRONMENT

BACKGROUND OF THE INVENTION

This invention relates generally to the blocking of information, and more particularly, to the blocking of inbound information from a LAN to a multiprocessor having multiple hosts running in a single computer and are sharing a connection to the LAN.

In computing a logical partition, commonly called an LPAR, is a subset of computer's hardware resources, vitualized as a separate computer. In effect, a physical machine can be partitioned into multiple LPARs, each housing a separate operating system. Each LPAR may be thought of as, and is referred to as herein, a separate host.

Logical partitioning is performed mostly on the hardware layer. Two LPARs may access memory from a common memory chip, provided that the ranges of addresses directly accessible to each do not overlap. One partition may indirectly control memory of a second partition, but only by commanding a process of the second partition to directly operate on the memory. Initially, each CPU was dedicated to a single LPAR, but with introduction of micro-partitioning one CPU can be shared between separate LPARs.

When running a Virtualization Layer on an embedded system with multiple processors and a limited number of resources, special algorithms are needed to guarantee all hosts being serviced are given inbound LAN traffic in a timely manner. These algorithms need to manage the host buffers, local buffers, inbound LAN packets, latency, and inbound blocking efficiency. The term "blocking" as used herein shall refer to the process by which data packets are packaged into memory blocks.

The algorithms need to dynamically adjust to changes in traffic patterns generated by different host applications. Some of these host applications are latency sensitive while others are throughput sensitive. The arrival rate of packets for specific connections needs to be monitored to determine how and when packets need to be forwarded to the specific hosts.

If inbound Local Area Network (LAN) packets are routed to the hosts too quickly and the blocking is inefficient, then a shortage in local buffer space or host buffer space could occur resulting in a loss of inbound LAN packets. This mainly occurs due to the inefficient use of the available buffer space. In such a case, the host buffer space is under utilized and packing is very low, causing most of the host buffer space to be wasted. Only a small amount of LAN traffic is placed into the larger host buffer space.

The converse of this is when inbound LAN packets are routed to the hosts too slowly and a latency issue occurs. In this scenario, the host buffer space is efficiently packed with LAN packets, but the time between the presentation of these large host blocks can cause serious latency problems.

In an embedded system with multiple processors, how to split the inbound functions and the inter-processor communications between the processors is very important. This will directly affect the efficiency of the system and the design needs to identify all possible bottlenecks which could impeded system performance It would be desirable/advantageous to be able to efficiently block incoming LAN packets while ensuring that the information is timely presented to the destination host.

BRIEF SUMMARY OF THE INVENTION

An illustrative embodiment includes an incoming LAN traffic management system. The system if this embodiment includes an I/O adapter configured to receive incoming packets from an Ethernet and a plurality of hosts coupled to the I/O adapter and each having a host buffer. The system of this embodiment also includes a data router configured to block information received by the I/O adapter into memory locations of an SBAL associated with at least one of the plurality of hosts and in accordance with blocking parameters for the at least one of the plurality of hosts, the data router including an expiration engine configured to expire the SBAL before it is full if at least one predetermined threshold is exceeded.

Another embodiment if the present invention is directed to a method of expiring SBAL's during the blocking of incoming LAN traffic comprising: locating an SBAL that has passed its active life-span; removing the SBAL from an active SBAL list; transferring all data packets in the SBAL to a host; and placing the SBAL in a used SBAL list.

Another embodiment of the present invention is directed to a computer program product for executing the expirations of SBAL's during the blocking of inbound LAN traffic, the computer program product comprising: a computer-readable storage medium for storing instructions for executing the expiration if SBAL's during the blocking of incoming LAN traffic, the expiring of SBAL's comprising a method of: locating an SBAL that has passed its active life-span; removing the SBAL from an active SBAL list; transferring all data packets in the SBAL to a host; and placing the SBAL in a used SBAL list.

BRIEF DESCRIPTION OF THE DRAWINGS

Referring now to the drawings wherein like elements are numbered alike in the several FIGURES.

DETAILED DESCRIPTION OF ILLUSTRATIVE EMBODIMENTS

An illustrative embodiment of the present invention provides systems and methods which efficiently block incoming LAN traffic while maintaining sufficient delivery speeds to multiple hosts. Embodiments of the present invention may include one or more of the following aspects: systems and methods for determining when an SBAL is full (or within a specified level of fullness) and should therefore be released to the host buffer; and systems and methods for determining that a particular SBAL has been idle for to long of a period and should be released to the host buffer. In more detail, embodiments of the present invention include a microprocessor and a routing module that work together to efficiently manage the flow of inbound LAN traffic. Each of these functional engines is assigned specific tasks which are targeted to provide the highest level of performance. There are several resources and functions which may be managed by the microprocessors and the data router. These include the host buffers in the specific O/S, local buffers in the imbedded system memory, routing of inbound LAN packets, latency, and inbound blocking efficiency.

Figure 1:
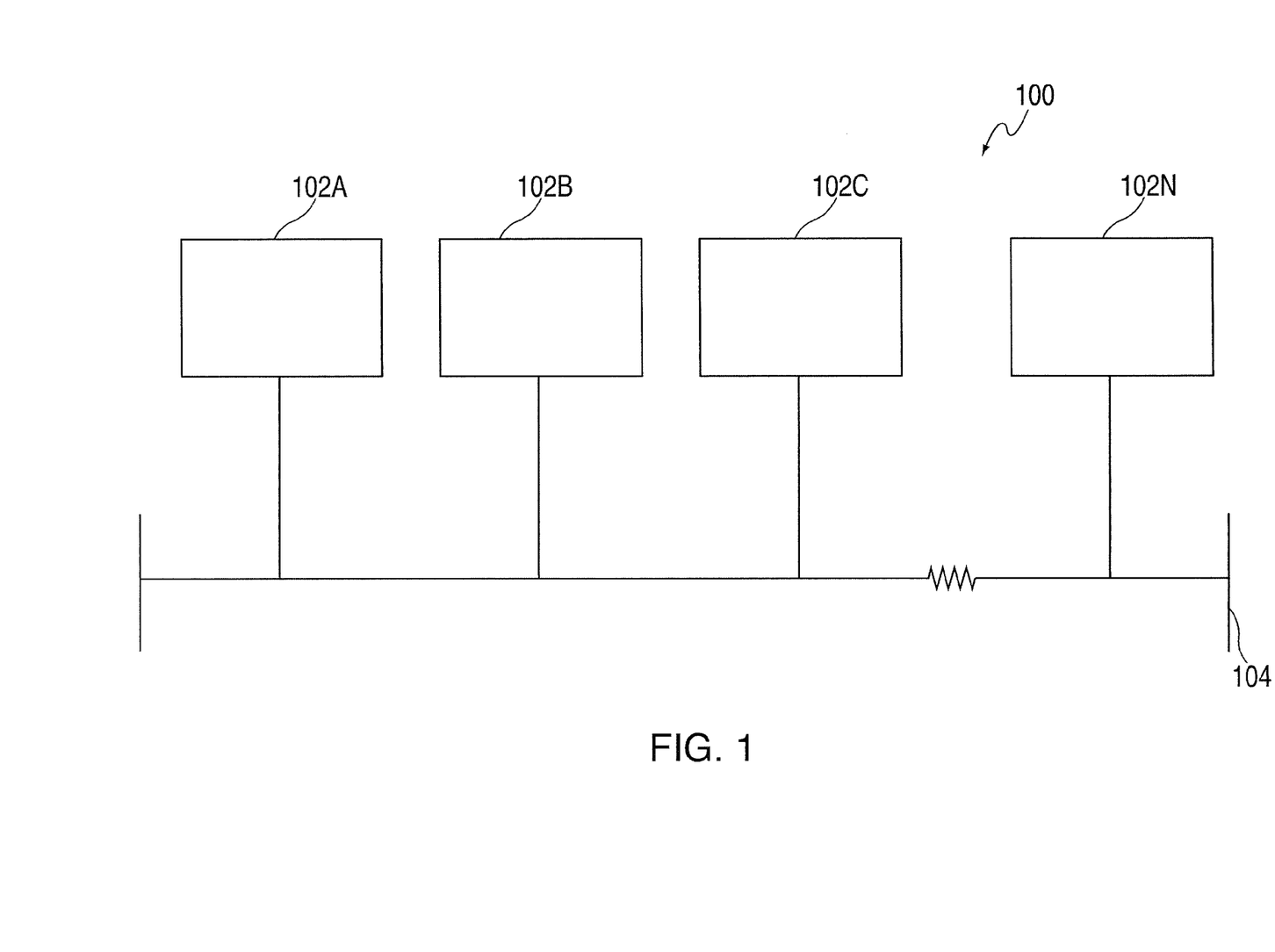
FIG. 1 shows an example of a LAN in which the present invention may operate.

FIG. 1 shows an example of a local area network 100 in which aspects of the present invention may operate. The local area network 100 of this embodiment includes an Ethernet 104 and a plurality of computers 102A-102N connected thereto. Each computer 102 may include one or more addresses assigned there to. These addresses refer to either the computer individually or one of the hosts located therein. As discussed previously, a computer may be divided into LPAR's where each LPAR is considered an individual host. That is, each LPAR appears to the network (as well as to itself), as a separate computer.

Figure 2:
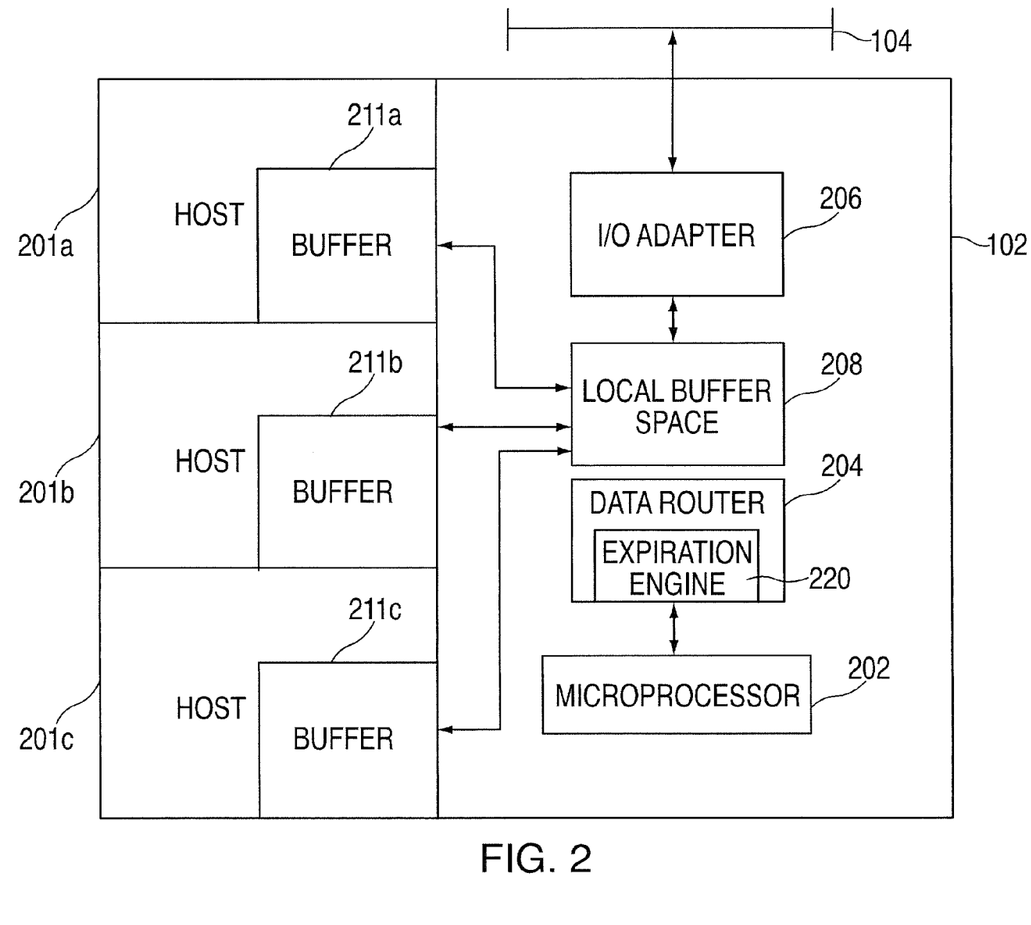
FIG. 2 shows an example of a computer partitioned into multiple hosts and on which the present invention may be implemented.

FIG. 2 shows an example of one embodiment of a computer 102 according to the present invention. The computer 102 is coupled to the Ethernet 104 to allow for information from the Ethernet. The computer 102 of this example has been partitioned into three separate hosts 201a, 201b and 201c. Of course this is by way of example only and the computer 102 could be partitioned into any number of hosts. Each host 201 may operate its own operating systems (O/S) and appears to the Ethernet (and to itself) as a separate computer.

The computer 102 also includes a microprocessor 202 and a data router 204. The microprocessor controls all operations in the computer 102. That is, the microprocessor 202 performs all of the processes for each host. The computer also includes local buffer space 208 into which incoming LAN traffic is placed.

The data router 204, as discussed in greater detail below, is used to allocate buffer memory space between the hosts 201a, 201b and 201c and local buffer space 208 and to control the routing, among other things, of data from the I/O adapter 206 into each host. The partitioning of the computer also allows for each host 201a, 201b and 201c to have allocated to it a host buffer 211a, 211b and 211c, respectively.

In general, the packaging of incoming LAN data is handled by the data router 204. The I/O adapter 206 receives the packets addressed to any of the hosts 201 resident in the computer 102. As information is received it is placed into the local buffer space 208. Eventually, the information will be transferred to the host buffer space 211 of the particular host 201 that is its destination.

Figure 6:
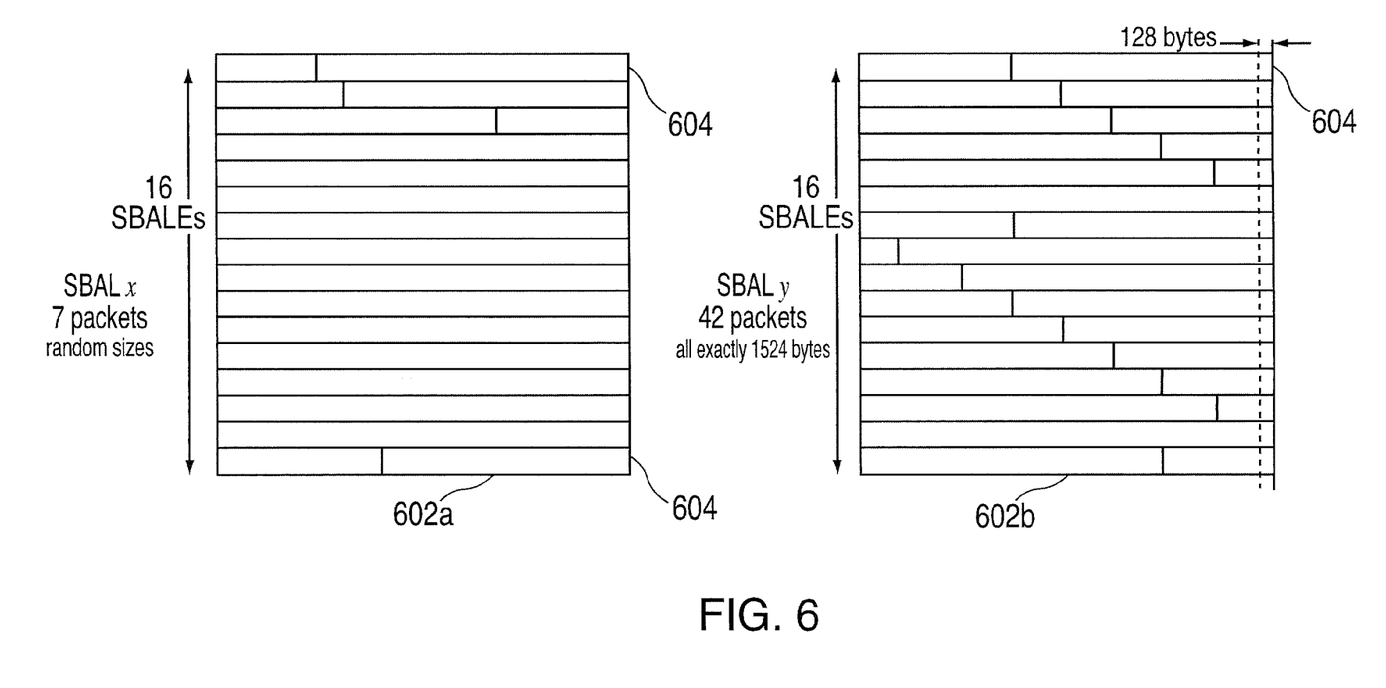
FIG. 6 shows two examples of representations of an SBAL.

The microprocessor 202 manages the fetching of the host buffers 201 into which the inbound LAN traffic will be placed for each host. The LAN traffic is placed into logical units called storage blocks. Each storage block has an address that is contained in a Storage Block Address List (SBAL). In one embodiment, the SBAL contains 64K bytes of address space divided into 16 entries, each entry being 4K bytes wide. An example of two SBAL's is shown in FIG. 6. Each SBAL 602 includes, in one embodiment 16 subdivisions called SBALE's 604. Each SBALE 604 describes 4 k Bytes of contiguous host memory space. A packet must fit entirely within the remaining space of a given SBAL in order to be allocated there. If it does not fit in the current SBAL, the current SBAL is returned to host immediately and the packet is allocated to the next available SBAL. As shown in FIG. 6, the first SBAL 602a contains 7 packets and the second SBAL 602b contains 42 packets.

The SBAL's are made available to the microprocessor 202 by the data router 204. In some embodiments, the data router 202 may be a combination of an application-specific integrated circuit (ASIC) and a field-programmable gate array (FPGA). The data router 204 handles both the blocking of the incoming LAN traffic as well as ensuring the traffic reaches the host in a timely manner.

As shown in FIG. 2, each host 201 includes its own buffer 211 for ease of explanation. As one of ordinary skill in the art will readily realize, the host buffers 211 may actually physically exist in the local buffer space 208.

As traffic is received from the LAN via the I/O adapter 206, incoming packets are placed into portions of local buffer space 208 which have been pre-assigned to the particular host 201 to which the packet addressed. During this time, the data router 204 causes the particular storage blocks being filled to be under control of the I/O adapter 206, rather than the host 201 to which it is assigned. The incoming traffic is placed into the blocks until a particular block is deemed full or some other pre-set time or condition has been met. After the blocks (e.g. those memory locations addressed in a particular SBAL) are full or the pre-set time or condition has been met, the data router 204 causes control of the SBAL to be returned to the particular host 201 to which it is assigned. After control of the particular memory block has been returned to the host, the host may operate as required on the data contained in the memory location.

The microprocessor 202 may also manage two counts that control the high and low water mark for the number of memory blocks of the host buffers 211 which have been given to the data router 204. These counts are used to track when more host buffer 211 memory blocks need to be made available and also to not over allocate the local buffer space 208.

As discussed above, information comes in via the I/O adapter 206 and is stored in the local buffer space 208. This information may be placed into particular memory blocks associated with a particular host. The location of each storage block in the host buffer 211 is contained in the SBAL. The host 201 may not operate in memory locations addressed in the SBAL until the SBAL is removed from the active SBAL list. That is, while the information is being blocked into the host buffer space 211, the host 201 cannot operate on the information until it is released by the data router 204.

As mentioned, the number of packets grouped together (blocked) as they are transferred to the host buffers 211 can have an impact on the overall performance of a connection. The amount of time a packet is delayed can also have an impact on the performance. Some applications are sensitive to latency where others are more throughput oriented. In the multiple host environment several applications can be running through the same data router 204 at the same time. This makes the blocking decisions in this environment even more critical.

Thus, there is a need for having different Blocking Algorithms for different applications run by the hosts. Some applications are latency sensitive and others are throughput sensitive.

There is also a need for each connection being able to dynamically set and adjust the blocking algorithm. To provide the most efficient blocking algorithm, a blocking criteria must be set. The criteria may include determinations of when a particular block is full, the Inter-Packet Gap Time and the Maximum Block Delay Time.

The Inter-Packet Gap Time is the maximum time the data router 204 will wait between packets for a specific interface before forwarding an "in progress" block to the Host.

The Maximum Block Delay Time is the maximum time an "in progress" block will be delayed by the data router 204.

The blocking algorithm may also determine cases when no blocking should occur at all. Historical information such as packet rates over specific time intervals, size of packets received on an interface and adapter utilization, may also have an effect on the blocking algorithm.

The data router 204 allows for the setting and updating of the blocking algorithm. When a host 201 establishes a connection to the shared data router 204, the initial blocking algorithm settings are made. These include the Inter-Packet Gap Time and Maximum Block Delay Time.

For the Inter-Packet Gap Time, two different values are configurable due to the large range (1-9 K for Ethernet) of frame sizes which can be transmitted. One value is for frames up to 1500 bytes. The second value is for frames up to 9 K bytes.

The Minimum Packet Size, Maximum Block Size, Maximum Frames Size, the No Blocking Flag and TCP Header Flag are some other configurable options. The Minimum Packet Size parameter is used to change the expiration timers used to determine when to forward the SBAL blocks when a packet under a certain size is received. The Maximum Block Size limits the size of the data contained in the block. The Maximum Frames Size limits the number of LAN packets which can be contained within a Block. A No Blocking Flag disables blocking for a specific connection. The TCP Header Flag option is used to force the forwarding of blocks when a TCP packet has a specific bit set in the TCP Header (for example the Acknowledge Character (ACK) and the Synchronous Idle Character (SYN) flags for the ACK and SYN to be used in this connection).

The Host O/S may also have the capability to dynamically change any of these values and communicate these changes to the microprocessor's 202 microcode which in turn sets them in the data router 204.

These values are used by the data router 204 to determine when SBALs containing inbound packets should be forwarded back to the microprocessor 202, so the target host 201 can be notified.

An override interface may also exist which allows the microprocessor 202 microcode to force the expiration of any pending SBALs for any or all of the host 201 connections. As discussed above, the data router 204 is responsible for assembling the inbound packet data into the buffer space provided from the SBALs which have been enqueued by the microprocessor 202.

In one embodiment, the data router 204 may include various search engines used to locate the proper SBAL, various hardware functions to determine when SBAL buffer space has been expired or is near expiration, and the set timer parameters set by the host 201 to control when SBALs need to be expired. The implementation of these functions in the data router 204 is described in detail below.

When the data router 204 determines that it can no longer allocate packets to a given SBAL it will dequeue it from the "available" SBAL list. After all of the data which was allocated to the SBAL has been moved to the host, the data router 204 place the SBAL in a "used list." After an SBAL is placed in the used list, the microprocessor 202 may allow the particular host access to the information. The data router 204 determines when it is done allocating to an SBAL based on multiple programmable and fixed parameters.

Determinations that a Particular SBAL is Full

The blocking algorithm in the data router 204 may be used to determine when the data router is done with an SBAL due to it being considered FULL. The following list of decisions indicate conditions, as determined by the blocking algorithm, that a particular SBAL entry is full and should be returned to the host:

1. Current packet being allocated spans a space greater than that available in the currently active SBAL;

2. Maximum Packets per SBAL: A programmable value which determines the maximum number of packets allowed to be allocated to a single SBAL; and 3. SBAL Full Threshold: A programmable value which controls how much space can be allocated in the last element of the SBAL before hardware considers it full.

As one of ordinary skill in the art will readily realize, if any of the conditions of element 1, or the values of elements 2 or 3 are met or exceed, the SBAL is considered full and may be returned. In addition, there are instances where the particular SBAL should be returned to the host before it is full. In such instances, the SBAL is expired based on calculations performed in an expiration engine 220 portion of the data router 204.

Expiration of SBAL's

Expiration of the SBAL will remove the SBAL from the active list just as the SBAL becoming full would do. SBAL expiration is handled by the expiration engine 220 of the data router 204. The expiration engine 220 may include a programming interface that allows the microprocessor 202 to skip the data router 204 based search engine (discussed below) and automatically expire the programmed connections SBAL.

Figure 3:
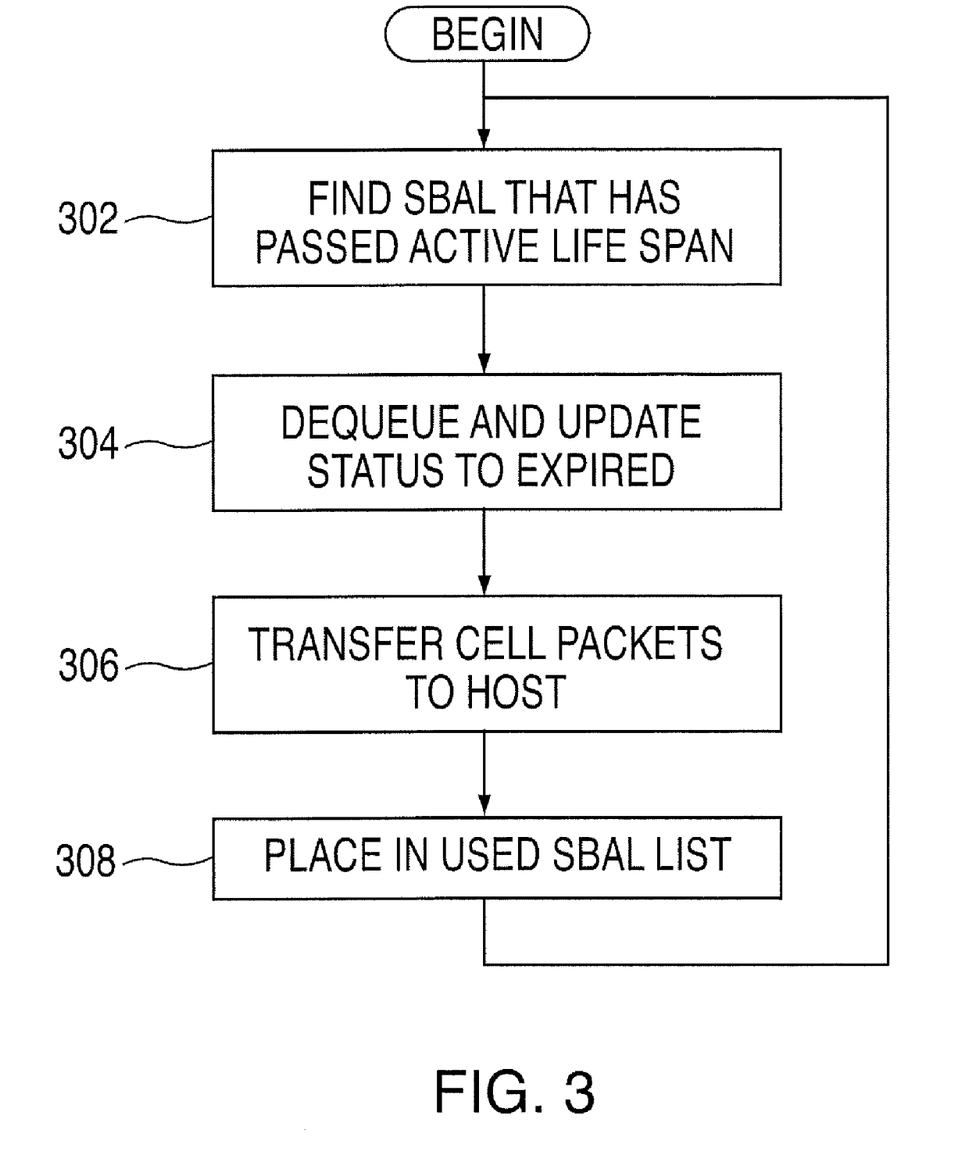
FIG. 3 is a flow diagram showing an embodiment of a method expiring a partially filled SBAL.

FIG. 3 is flow diagram showing one method in which SBAL's may be expired. The process begins at step 302 where the expiration engine 220 of the data router 204 finds an SBAL that has passed its allowed active life span. In one embodiment, this may be accomplished by utilizing a hardware bus auto-expiration search engine. Of course, the search engine may be implemented as part of either the expiration engine 220 or the data router 204 and, as one of ordinary skill in the art will readily realize, could also be implemented in software or firmware.

Figure 4:
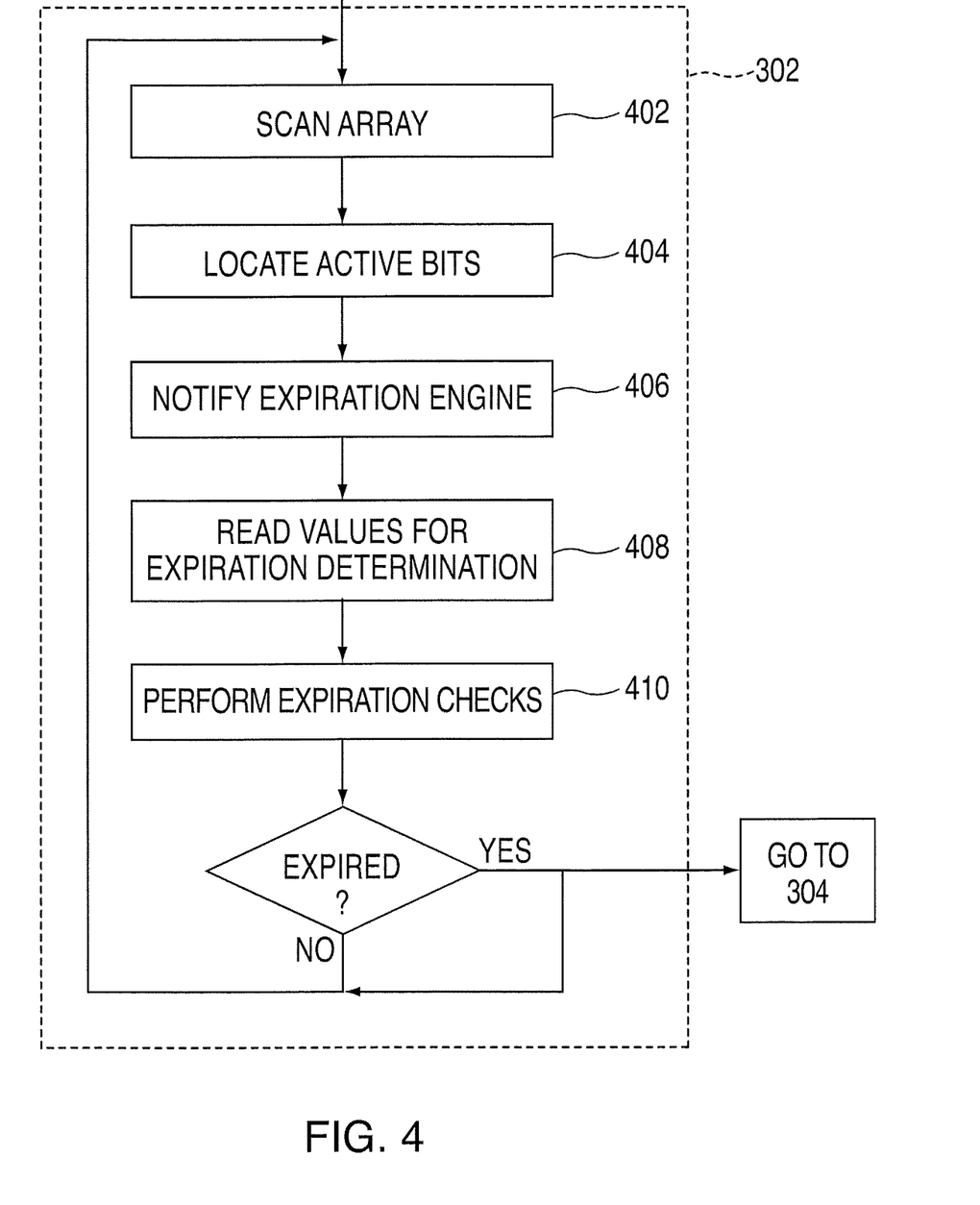
FIG. 4 is a flow diagram showing one method by which the process embodied in step 302 of FIG. 3 may be accomplished.

FIG. 4 is a flow diagram showing one method by which the process embodied in step 302 of FIG. 3 may be accomplished. That is, FIG. 4 shows an example of a process that may be performed to find SBAL's that have passed their active life span. The process begins at step 402 where an array containing valid connection indicator bits is scanned by a searching engine. In one embodiment, the array is a 32-bit wide by 64 entry deep (2048 bit positions) array which houses the "valid" indicator bits for each connection. When there is an active SBAL at the head of the connections SBAL list, the valid bit is set in the corresponding array location to indicate such to the search engine.

The expiration engine 220 may include a searching function that scans through the array 302 looking for connections which have the bit set. When it finds the next valid location it tells the expiration engine 220 the connection ID to service.

The search function performs the array search in such a way as to be able find every bit position and indicate such to the expiration engine if every bit in the array was always active. It does this by indexing 1 bit-position further into the array read data value with each revolution of the array depth to begin its search for an active bit to ensure that it can "see" every bit position after 32 revolutions of the array. From this starting index, the search engine scans forward in the array location looking for the next active bit of that array line.

If the search engine finds an active position in the line (step 404), it indicates the connection ID (i.e., the host) of the location to the expiration engine 220 (step 406) and then moves on to find the next active bit position starting at the next array address. The array is constantly scanned, reading the next array location each clock cycle. The search engine can be configured to only search a programmed connection ID range for expired connections, or to not search at all (disabled).

Figure 5:
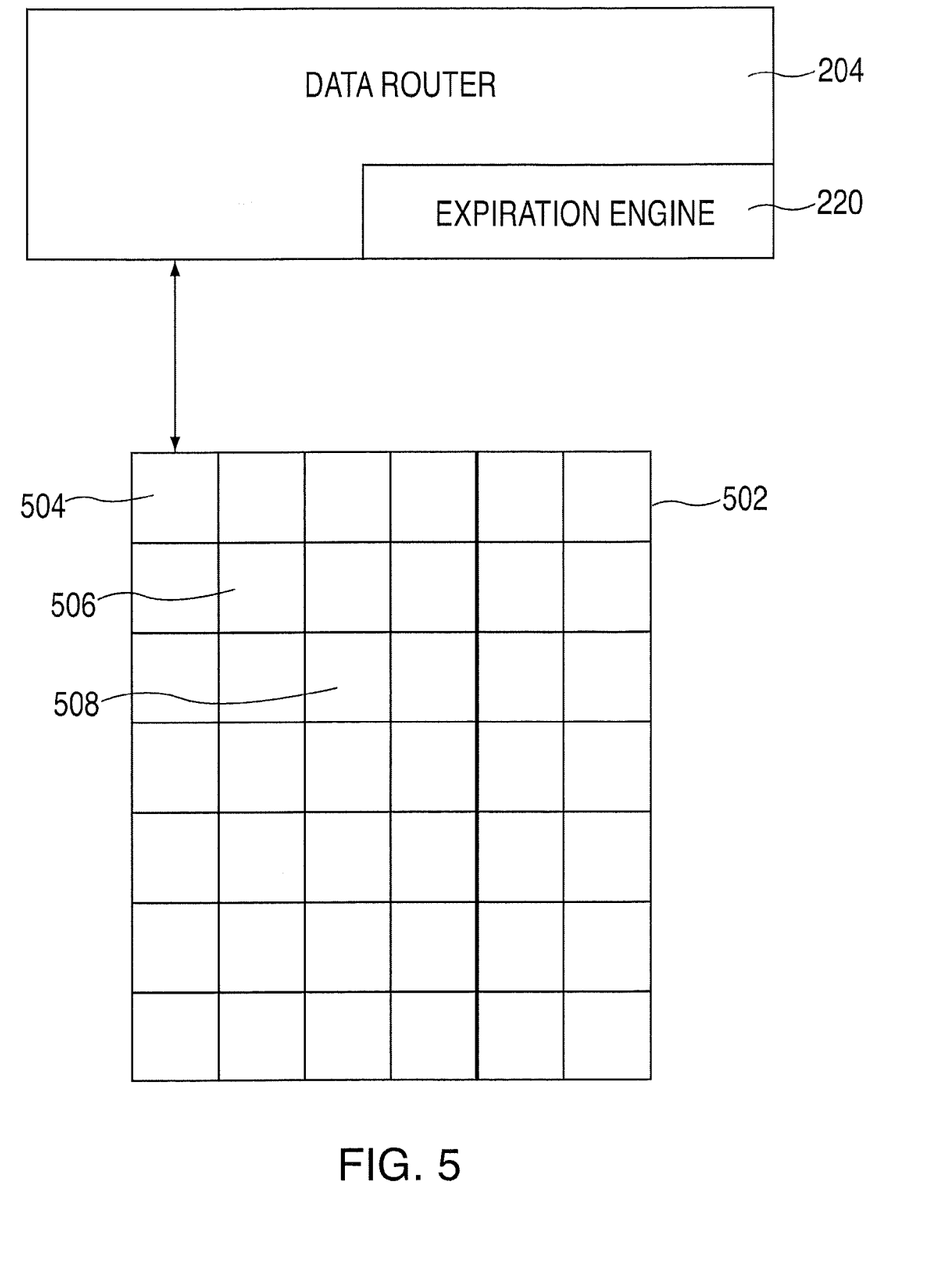
FIG. 5 is an example of an array of connection statuses on which a search engine according to an embodiment of the present invention may operate.

An example of such an array 502 is shown in FIG. 5. As discussed above, if the first scan begins at location 504, the next scan will begin at location 506, and the next a location 508, and so on. Such conditions ensure that the scanning of the array will be fair and will not only scan the first couple of locations in each scan.

Referring again to FIG. 4, after a connection ID is either found by the search engine or programmed for expiration by the microprocessor 202 microcode, the expiration engine 220 attempts to expire the SBAL at the head of the connections SBAL list. It may accomplish this by first checking to make sure the SBAL at the head of the list is still active. If it is still active it then reads values for performing an expiration determination at step 408. The values may include, but are not limited to, the current time value, the expiration array for the connection ID, and the programmed expiration timers for the given connection ID.

The current time value (CURRENT) is a constantly running counter that increments 1 every M clock cycles. M is a multiplier value that is programmable via the microprocessor 202 microcode.

The expiration array contains the following information for each connection ID:

1. Large Packet Indicator: Indicates when there is a large packet allocated within the active SBAL. What is considered "large" is configurable via firmware;

2. Number of auto-expirations remaining: Indicates how many more times this connection can be expired. When this value hits 0, no more SBALs will be expired. This value is reset when an SBAL is added to the connections available SBAL list or the microprocessor 202 microcode resets it manually. This can also be used to not expire SBALs when a low water mark of SBALs are available;

3. Total Expiration Time-stamp: Indicates the time of the very first allocation to the currently active SBAL; and 4. Inter-packet Expiration Time-stamp: Indicates the time of the last allocation made to the currently active SBAL.

In addition, there are 3 programmed timers for each connection ID: 1. Total Expiration Timer Life-span for the entire SBAL from first packet arriving; 2. Large Packet Inter-packet Expiration Timer: Life-span of the SBAL between each packet allocation for SBALs which contain Large packets; and Small Packet Inter-packet Expiration Timer Life-span of the SBAL between each packet allocation for SBALs which contain only small packets.

All three of these timers are programmable individually for each connection. This is accomplished with a pool of 32 programmable timer values and a programmable timer select array. The pool of timers contains 32 different timer values which can then be selected from for each of the 3 timer values of each connection. The selection mechanism is a programmable array which contains a 5 bit value for each of the timers for each possible connection. To read the timer values hardware indexes into the timer select array to find the 3, 5-bit values for the timer selects, then uses those timer select values to read out the proper programmed timer from the pool of 32. It then uses the 3 timers for doing the expiration checks described below.

Once the expiration engine has these values, it performs the expiration checks in step 410. The checks that are performed are as follows:

1. Is the Number of auto-expirations remaining 0? If yes do NOT expire, move on to the next connection ID, else go to 2.

2. Is the total timer expired for this SBAL? If yes, expire the SBAL, else go to 3.

3. Does this SBAL contain Large packets? If yes go to 4, else go to 5.

4. Is the inter-packet timer expired using the programmed large packet inter-packet timer for this SBAL? If yes, expire the SBAL, else move on to the next connection ID.

5. Is the inter-packet timer expired using the programmed small packet inter-packet timer for this SBAL? If yes, expire the SBAL, else move on to the next connection ID.

The determination as to whether a particular active life span has been exceed is shown in the logical code shown below in which the value "IS_EXPIRED" is set to true if the SBAL should be expired. In this logical code, WINDOW is the currently selected programmed timer value for the timer being compared. CURRENT is the current time value. TIME-STAMP is the time-stamp from the expiration array for the given timer being compared and WINDOW is a time period being analyzed (e.g., the total timer value and the large and small inter-packet time values).

---

IS_EXPIRED <= TRUE when
(((TIME-STAMP + WINDOW) < TIME-STAMP) -- wrapped window
    a. and (CURRENT >= (TIME-STAMP + WINDOW)) -- middle
        window and (CURRENT < TIME-STAMP))
    b. or (((TIME-STAMP + WINDOW) >= TIME-STAMP) --No
        window wrapping
           and ((CURRENT >= (TIME-STAMP + WINDOW)) --linear
           case
    c. or (CURRENT < TIME-STAMP))) --curr_time wrap case
    d. else FALSE;

---

If the result is TRUE, at decision block 412, the process is returned to step 304 of FIG. 3. Also, regardless of whether the result is true or false, the process shown in FIG. 4 continues to run and the process is returned to step 402.

It should be understood that the above logic contains steps for both wrapped and unwrapped clocks.

Referring now back to FIG. 3, if the result of step 410 (FIG. 4) is TRUE, the SBAL has expired and must be marked DONE. No more packets will be allocated to this SBAL. All further incoming packets will be allocated to the next SBAL on the list. This may be accomplished by dequeueing the SBAL from the head of the list and writing a status to the SBAL header indicating that the SBAL is expired in step 304.

After all of the packets which have been allocated to space within the SBAL have been stored to host memory in step 306, the SBAL is then enqueued to the "Used SBAL List" is step 308. Being placed in the used SBAL list, in effect, allows the host to operate on the SBAL.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to illustrative embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. An incoming LAN traffic management system comprising:
    an I/O adapter configured to receive incoming packets from an Ethernet;
    a plurality of hosts coupled to the I/O adapter and each having a host buffer;
    a data router configured to block information received by the I/O adapter into blocks and store the blocks in a storage block address list (SBAL) associated with at least one of the plurality of hosts and in accordance with blocking parameters for the at least one of the plurality of hosts, the data router including an expiration engine configured to expire the SBAL before it is full if at least one predetermined threshold is exceeded; and
    a search engine in electrical communication with the expiration engine and configured to locate an active SBAL, the search engine configured to:
        examine a two-dimensional array having sequential rows and containing representations of active SBAL's and wherein examining includes performing a first pass beginning at a cell at a first offset in a first row and a second pass after completion of the first pass beginning at a cell at a second offset different than the first offset in the next sequential row.

2. The system of claim 1, wherein the SBAL includes 16 SBALE's.

3. The system of claim 2, wherein each SBALE includes 4K bytes of address space.

4. The system of claim 1, wherein the expiration engine is configured to expire an SBAL if a large packet inter-packet timer has expired.

5. The system of claim 1, wherein the expiration engine is configured to expire an SBAL if a small packet inter-packet timer has expired.

6. The system of claim 1, wherein the expiration engine is configured to expire an SBAL if a total time timer has expired.

7. The system of claim 1, further comprising:
    a pool of programmable timers; and
    a timer select array;
    wherein each SBAL is assigned three programmable timers from the pool of programmable timers.

8. A method of expiring storage block address lists (SBAL's) during the blocking of incoming LAN traffic, each SBAL being a portion of computer memory for storing blocks of the inbound LAN traffic, comprising:
    locating, at a receiving computing device, an SBAL that has passed its active life-span, locating including:
        electronically examining a two-dimensional expiration array stored in the receiving computing device and having sequential rows and containing representations of active SBAL's, wherein examining includes removing the SBAL from an active SBAL list in the receiving computing device;
    transferring all data packets in the SBAL to a host computing device; and
    placing the SBAL in a used SBAL list.

9. The method of claim 8, further comprising:
    locating an active connection; and
    performing at least one expiration check on the active connection.

10. The method of claim 9, wherein performing includes determining if one of the total expiration time or the inter-packet expiration time has been exceeded.

11. The method of claim 10, wherein performing includes determining if the auto-expiration indicator has been set to a predetermined value.

12. A computer program product for executing the expirations of SBAL's during the blocking of inbound LAN traffic, each SBAL being a portion of computer memory for storing blocks of the inbound LAN traffic, the computer program product comprising:
    a computer-readable storage medium for storing instructions for executing the expiration if SBAL's during the blocking of incoming LAN traffic, the expiring of SBAL's comprising a method of:
    locating an SBAL that has passed its active life-span, locating including:
        electronically examining a two-dimensional expiration array stored in the receiving computing device and having sequential rows and containing representations of active SBAL's, wherein examining includes performing a first pass beginning at a cell in a first row at a first offset and a second pass after completion of the first pass beginning at a cell at a second offset different than the first offset in the next sequential;
    removing the SBAL from an active SBAL list;
    transferring all data packets in the SBAL to a host; and
    placing the SBAL in a used SBAL list.

* * * * *